US 008833396B2

(12) United States Patent
Kato

(10) Patent No.: US 8,833,396 B2
(45) Date of Patent: Sep. 16, 2014

(54) MULTIPLE ELECTROMAGNETIC VALVE

(75) Inventor: Hisataka Kato, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 438 days.

(21) Appl. No.: 13/243,183

(22) Filed: Sep. 23, 2011

(65) Prior Publication Data

US 2012/0085953 A1    Apr. 12, 2012

(30) Foreign Application Priority Data

Oct. 7, 2010    (JP) ................................ 2010-227802

(51) Int. Cl.
F16K 11/24    (2006.01)
F15B 13/08    (2006.01)
F16K 27/00    (2006.01)

(52) U.S. Cl.
CPC ........... *F16K 27/003* (2013.01); *F15B 13/0842* (2013.01)
USPC ...................................... 137/884

(58) Field of Classification Search
USPC ................................. 137/884, 885
See application file for complete search history.

(56) References Cited

U.S. PATENT DOCUMENTS

| 3,918,489 | A | * | 11/1975 | Foster et al. | ............. | 137/596.16 |
| 3,957,079 | A | * | 5/1976 | Whiteman | ............... | 137/596.18 |
| 4,718,451 | A | | 1/1988 | Kosugi | | |
| 5,471,839 | A | * | 12/1995 | Hirata et al. | .................... | 60/484 |
| 5,704,399 | A | * | 1/1998 | Hayashi et al. | ............... | 137/884 |
| 5,749,395 | A | * | 5/1998 | Hayashi et al. | ........... | 137/596.16 |
| 5,975,134 | A | * | 11/1999 | Schwelm | ................. | 137/596.15 |
| 6,250,335 | B1 | * | 6/2001 | Ohishi et al. | .................. | 137/884 |
| 6,405,815 | B1 | * | 6/2002 | Stoever et al. | ............... | 180/53.4 |
| 6,505,645 | B1 | * | 1/2003 | Pack et al. | ................ | 137/596.13 |
| 6,837,269 | B2 | * | 1/2005 | Reinelt et al. | ............ | 137/596.16 |
| 6,866,065 | B2 | * | 3/2005 | Camozzi | .................. | 137/625.69 |
| 7,270,046 | B2 | * | 9/2007 | Stephenson et al. | ............ | 91/454 |

FOREIGN PATENT DOCUMENTS

| JP | 61-106672 | | 7/1986 |
| JP | 8-178105 | | 7/1996 |
| JP | 9-32941 | | 2/1997 |
| JP | 10-325483 | A | 12/1998 |
| JP | 11-208441 | A | 8/1999 |

OTHER PUBLICATIONS

Japanese Office Action issued Dec. 18, 2012 in Patent Application No. 2010-227802 with English Translation.

* cited by examiner

*Primary Examiner* — John Fox
(74) *Attorney, Agent, or Firm* — Oblon, Spivak, McClelland, Maier & Neustadt, L.L.P.

(57) ABSTRACT

A multiple electromagnetic valve includes a main valve portion in which four or more valve holes are formed parallel to each other inside a valve body, and a spool for switching flow paths is placed in each valve hole, and a pilot operating portion having solenoid-operated pilot valves that drive the spools with pilot fluid. The valve holes are disposed inside the valve body in two upper and lower tiers. A plurality of valve holes belongs in each of the upper tier and lower tier. The valve holes in the upper tier and the valve holes in the lower tier occupy different positions in the width direction of the valve body. The valve holes in the upper tier and the valve holes in the lower tier partially overlap each other in the plan view of the valve body.

11 Claims, 9 Drawing Sheets

MULTIPLE ELECTROMAGNETIC VALVE

BACKGROUND OF THE INVENTION

[1] Field of the Invention

The present invention relates to a multiple electromagnetic valve in which a plurality of valve mechanisms is incorporated in a valve body.

[2] Description of the Related Art

A multiple electromagnetic valve in which a plurality of valve mechanisms is incorporated in a valve body is known as disclosed, for example, in Patent Literature 1 (Japanese Unexamined Utility Model Registration Application Publication No. 61-106672), Patent Literature 2 (Japanese Unexamined Patent Application Publication No. 8-178105), and Patent Literature 3 (Japanese Unexamined Patent Application Publication No. 9-32941). Such a multiple electromagnetic valve has the advantage of being compact and therefore space-saving compared to the case where the same number of independent electromagnetic valves as the valve mechanisms are arranged.

However, the conventional multiple electromagnetic valve is such a multiple electromagnetic valve that inside a valve body, a plurality of valve mechanisms is arranged in the top-bottom direction or left-right direction of the valve body. There are enough spaces between adjacent valve mechanisms, and there is room for further reduction in size. Because a plurality of valve mechanisms is arranged in a straight line in the top-bottom direction or the left-right direction, in the case where for example, three or more valve mechanisms are incorporated, the size in the top-bottom direction (the height) or the size in the left-right direction (the width) of the valve body increases, and the handling and installation may become difficult.

A plurality of valve mechanisms can be arranged in the top-bottom direction and left-right direction so as to form rows and columns. However, if valve mechanisms are arranged in the top-bottom direction and left-right direction in rows and columns, the valve holes of the valve mechanisms fully overlap each other in the top-bottom direction and left-right direction. Therefore, it is difficult to form flow paths connecting the valve holes and ports. In order to go around adjacent valve holes, flow paths need to be bent greatly.

SUMMARY OF INVENTION

An object of the present invention is to provide a multiple electromagnetic valve in which a plurality of valve mechanisms is arranged reasonably, and thereby further reduction in size is achieved and the formation of flow paths is facilitated.

To attain the above object, the present invention provides a multiple electromagnetic valve including a main valve portion in which four or more valve holes are formed parallel to each other inside a valve body, and a spool for switching flow paths is placed in each valve hole, and that is provided with a plurality of output ports communicating individually with each valve hole, and a pilot operating portion having solenoid-operated pilot valves that drive the spools with pilot fluid. In this multiple electromagnetic valve, the valve holes are disposed inside the valve body in two upper and lower tiers, a plurality of valve holes belongs in each of the upper tier and lower tier, the valve holes in the upper tier and the valve holes in the lower tier occupy different positions in the width direction of the valve body, and the valve holes in the upper tier and the valve holes in the lower tier partially overlap each other in the plan view of the valve body.

In the present invention, it is preferable that one of the valve holes in the upper tier and one of the valve holes in the lower tier overlap each other, or that at least one of the valve holes in the upper tier or lower tier and two of the valve holes in the lower tier or upper tier overlap each other.

In an embodiment of the present invention, four valve holes are arranged such that two valve holes are located in each of the upper tier and lower tier, the distance between the centers of the two valve holes in the upper tier and the distance between the centers of the two valve holes in the lower tier differ from each other, and the valve holes in the upper tier or lower tier are closer to the middle in the width direction of the valve body than the valve holes in the lower tier or upper tier are.

In another embodiment of the present invention, four valve holes are arranged such that two valve holes are located in each of the upper tier and lower tier, and the valve holes in the upper tier are closer to one end in the width direction of the valve body than the valve holes in the lower tier are.

In the present invention, it is preferable that the valve holes be arranged symmetrically with respect to an imaginary plane that divides the valve body into two halves in the width direction, or that the valve holes be arranged line-symmetrically with respect to an imaginary straight line extending inside the valve body parallel to the axes of the valve holes.

In the present invention, the plurality of output ports are formed in a port forming surface of the upper surface of the valve body parallel to the valve holes, the output ports of any two adjacent valve holes occupy different positions in the direction of the axes of the valve holes, and both when the output ports are viewed from the direction of the side of the valve body and when the output ports are viewed from the direction of the axes of the valve holes, any two adjacent output ports partly overlap each other.

In the present invention, the pilot valves are arranged in the pilot operating portion in two upper and lower tiers, a plurality of pilot valves belongs in each of the upper tier and lower tier, the pilot valves in the upper tier occupy the same level, the pilot valves in the lower tier occupy the same level, and the pilot valves in the upper tier and the pilot valves in the lower tier fully overlap each other in the top-bottom direction in the plan view.

According to the present invention having the above-described structure, valve holes in a plurality of valve mechanisms is formed close to each other in a reasonable arrangement in the valve body. Therefore, compared to the case where the valve holes are arranged exactly in a straight line in the top-bottom direction or left-right direction, the width, height, and the like of the valve body can be reduced significantly, and further reduction in size of the electromagnetic valve can be achieved. In addition, in spite of the reduced width of the valve body, it is easy to form flow path holes connecting the valve holes and ports in the valve body around the upper and lower valve holes, and there is no necessity to greatly bend the flow path holes in order to go around the valve holes.

DESCRIPTION OF THE PREFERRED EMBODIMENT

Figure 1:
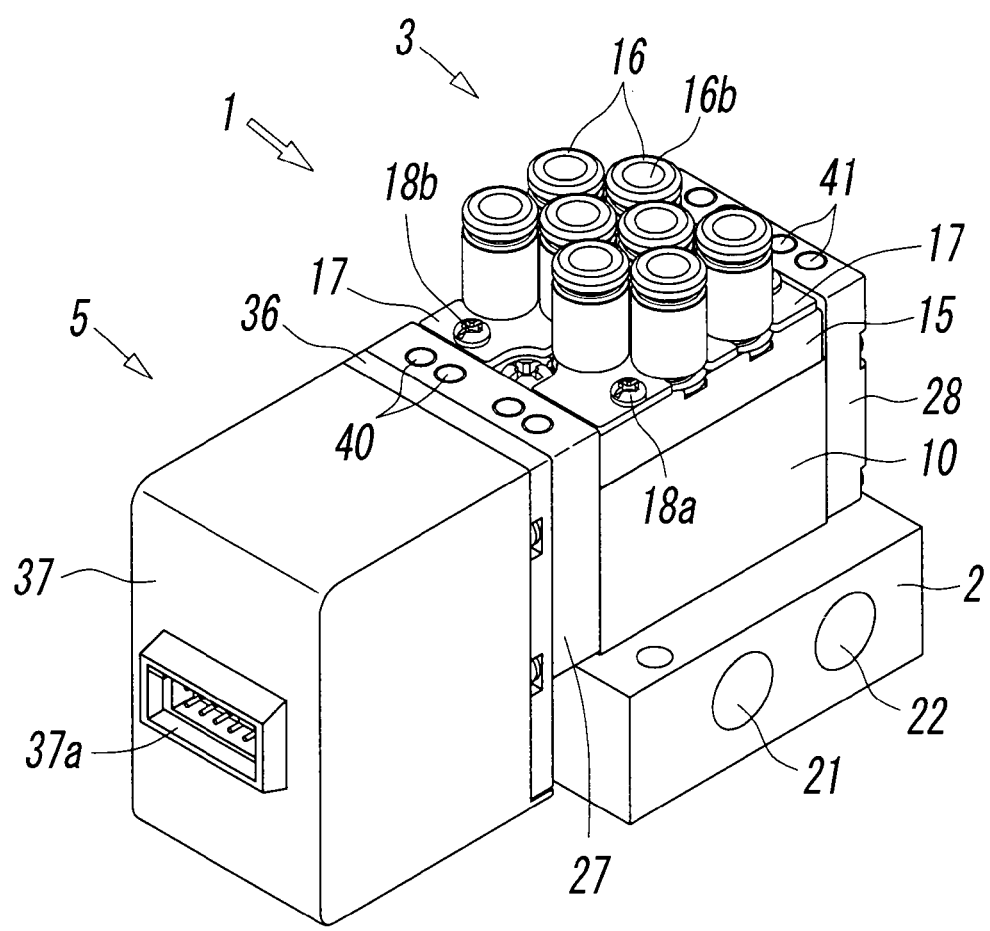
FIG. 1 is a perspective view showing a first embodiment of a multiple electromagnetic valve according to the present invention.

FIGS. 1 to 7 show a first embodiment of a multiple electromagnetic valve according to the present invention. The multiple electromagnetic valve 1 is mounted on a manifold base 2.

The multiple electromagnetic valve 1 has a plurality of sets of valve mechanisms that is of the same form and that have a valve structure as a five-port electromagnetic valve. The multiple electromagnetic valve 1 includes a main valve portion 3 having spools 4 that switch flow paths for main fluid, and a pilot operating portion 5 having solenoid operated pilot valves 6 that drive the spools 4 with pilot fluid. In this embodiment, both the main fluid and pilot fluid are compressed air.

Figure 2:
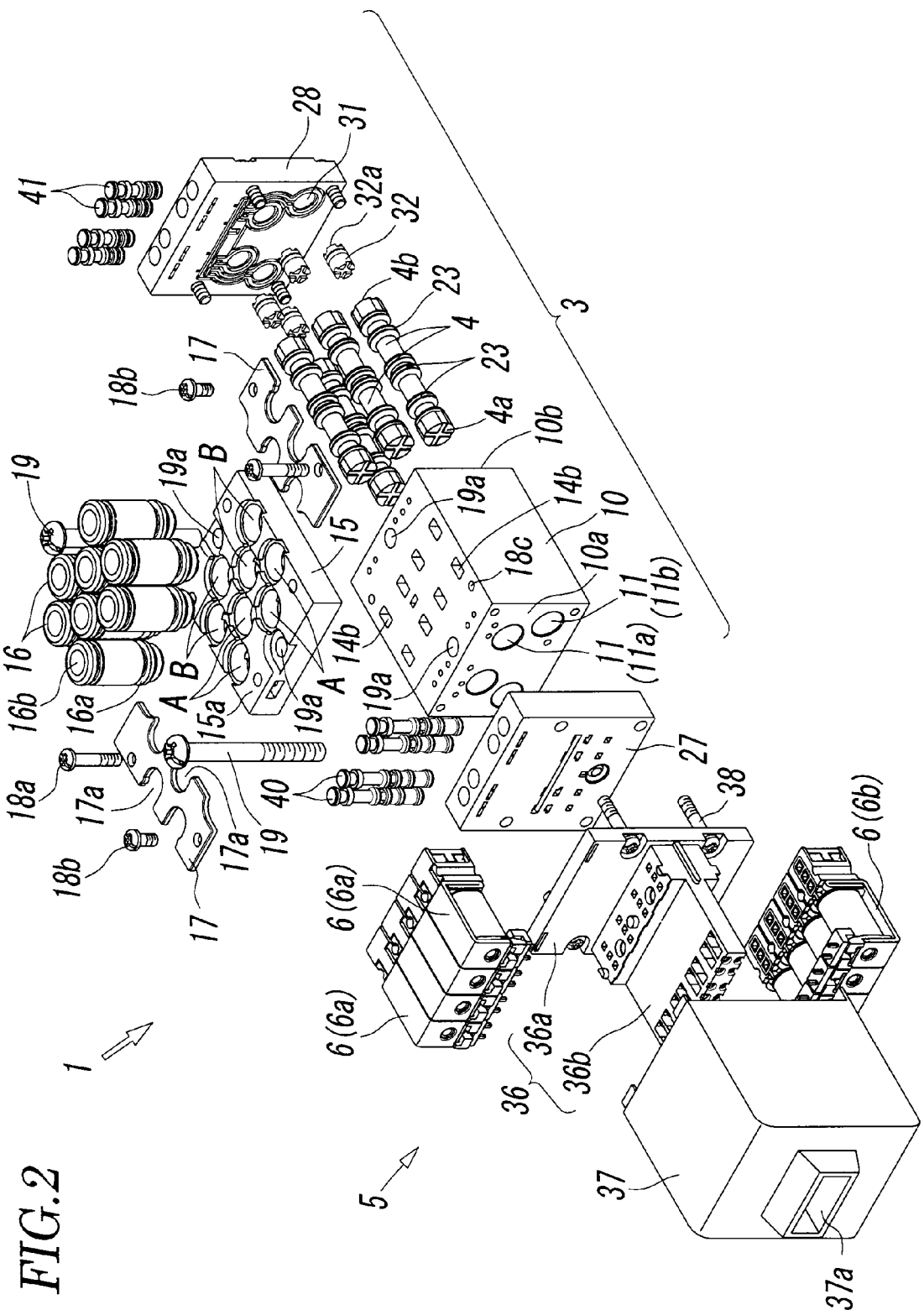
FIG. 2 is an exploded perspective view of FIG. 1.
Figure 4:
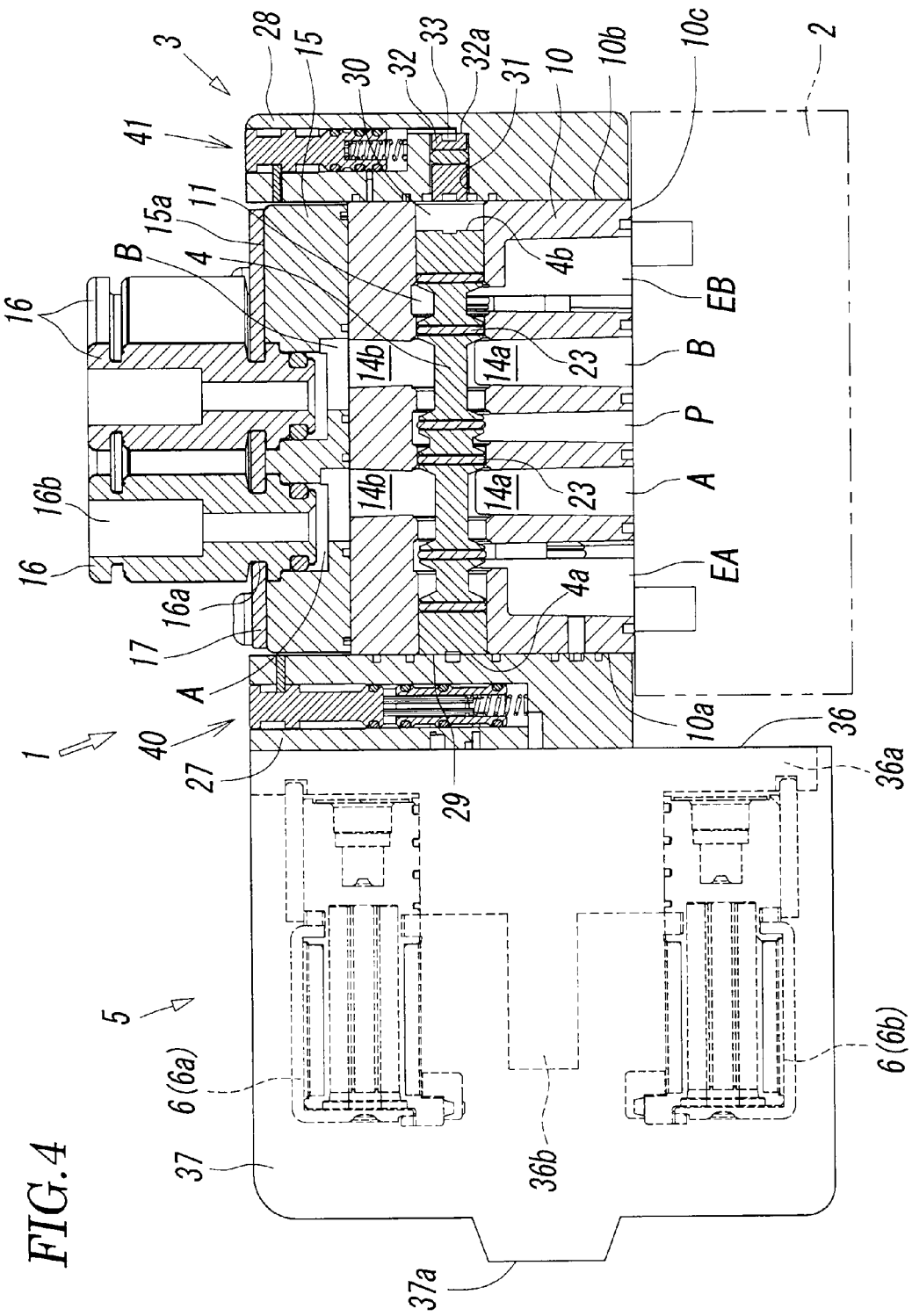
FIG. 4 is a sectional view of the main part of the main valve portion of the multiple electromagnetic valve of FIG. 1 cut at the position of a valve hole.

As can be seen from FIGS. 2 and 4, the main valve portion 3 has a rectangular block-like valve body 10. Inside the valve body 10, a number of valve holes 11 that correspond to the number of the valve mechanisms are formed parallel to each other. Both ends of each valve hole 11 open on a first end face 10a and a second end face 10b of the valve body 10. In each valve hole 11, the spool 4 is inserted slidably in the direction of axis of the valve hole 11. Each valve hole 11 is the same in size.

In the illustrated example, four valve holes 11 are disposed in two (upper and lower) tiers. In each of the upper and lower tiers, two valve holes 11 belong. In the following description, the valve holes 11 in the upper tier are denoted by reference numeral "11a", and the valve holes 11 in the lower tier are denoted by reference numeral "11b" as needed.

Figure 5:
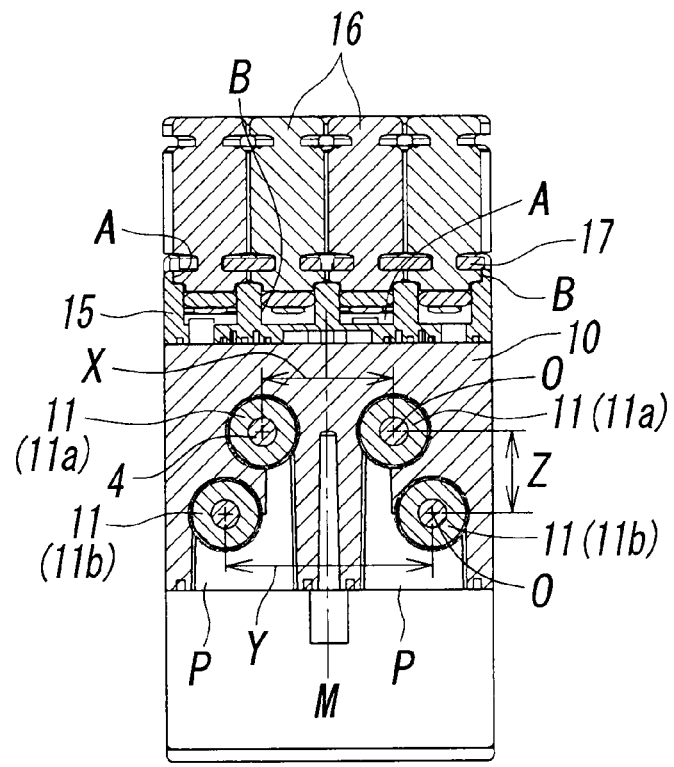
FIG. 5 is a sectional view of the valve body of FIG. 4 cut at the position of the supply port.
Figure 6:
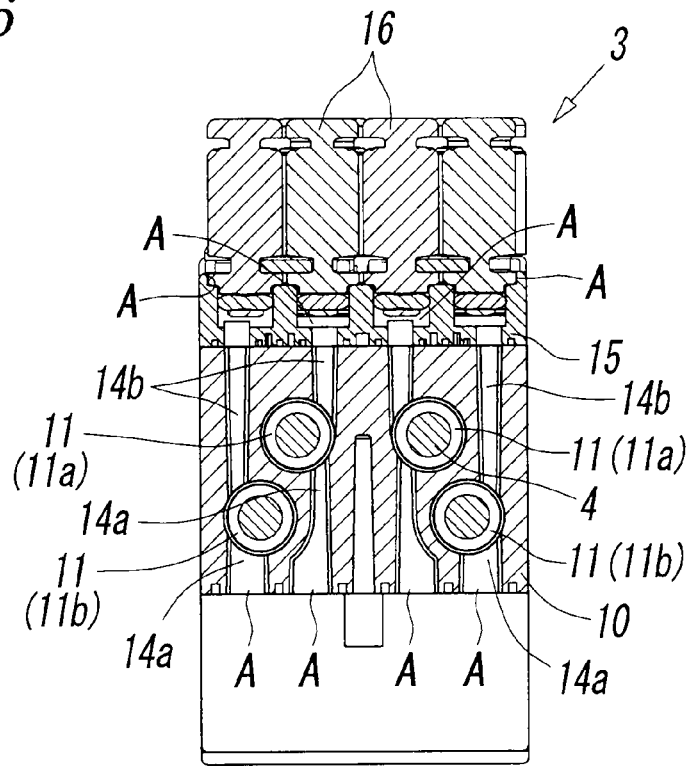
FIG. 6 is a sectional view of the valve body of FIG. 4 cut at the position of the first output ports.
Figure 7:
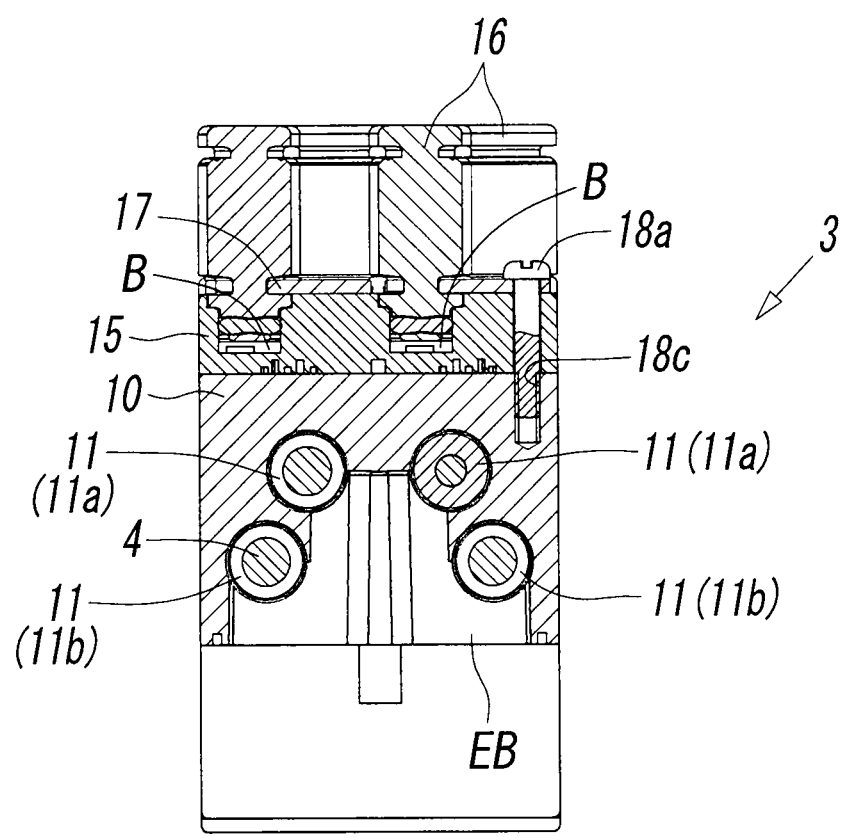
FIG. 7 is a sectional view of the valve body of FIG. 4 cut at the position of the second discharge port.

As is clear from FIGS. 5 to 7, the centers O of the two valve holes 11a in the upper tier are at the same level, and the centers O of the two valve holes 11b in the lower tier are also at the same level. However, the valve holes 11a in the upper tier and the valve holes 11b in the lower tier do not fully overlap each other in the top-bottom direction. The valve holes 11a in the upper tier and the valve holes 11b in the lower tier occupy different positions in the width direction of the valve body 10, and partially overlap each other in the top-bottom direction (the height direction) in the plan view (when the valve body 10 is viewed from the upper surface). In the illustrated example, the distance X between the centers of the two valve holes 11a in the upper tier is shorter than the distance Y between the centers of the two valve holes 11b in the lower tier, and the two valve holes 11a in the upper tier are closer to the middle in the width direction of the valve body 10 than the two valve holes 11b in the lower tier are.

The size of partial overlapping between the valve holes 11a in the upper tier and the valve holes 11b in the lower tier is about half of the maximum diameter of the valve holes 11 and may be slightly larger or smaller than it. In the illustrated example, the degree of partial overlapping between the two upper and lower valve holes 11a and 11b in the right half in the width direction of the valve body 10 is the same as that between the two upper and lower valve holes 11a and 11b in the left half. Therefore, the four valve holes 11 are arranged symmetrically with respect to an imaginary plane M that divides the valve body 10 into two halves in the left-right direction (the width direction). However, the degree of overlapping may differ between the right side and the left side. In this case, the arrangement is not symmetrical with respect to the imaginary plane M.

Forming the four valve holes 11 in the valve body 10 in such a arrangement makes it possible to significantly reduce the width of the valve body 10 compared to the case where the valve holes 11 are arranged in a row. In addition, in spite of the reduced width of the valve body 10, it is easy to form flow path holes such as output communication holes 14a and 14b in the valve body 10 around the upper and lower valve holes 11a and 11b, and there is no necessity to greatly bend the flow path holes in order to go around the valve holes 11.

The distance Z between the centers of the valve holes 11a in the upper tier and the valve holes 11b in the lower tier can be set shorter than in the case where the valve holes 11a and 11b fully overlap each other in the top-bottom direction. In the illustrated example, the distance Z is nearly equal to the maximum diameter of the valve holes 11 or slightly larger than it. Therefore, the lower ends of the valve holes 11a in the upper tier and the upper ends of the valve holes 11b in the lower tier are at about the same level or at slightly different levels. As a result, the height (thickness) of the valve body 10 can be reduced.

Inversely from the illustrated example, the distance X between the centers of the two valve holes 11a in the upper tier may be longer than the distance Y between the centers of the two valve holes 11b in the lower tier so that the two valve holes 11b in the lower tier are closer to the middle in the width direction of the valve body 10 than the two valve holes 11a in the upper tier are.

The lower surface of the valve body 10 is an attaching surface 10c for attaching to the manifold base 2. In the attaching surface 10c, a supply port P that communicates with each valve hole 11 as can be seen from FIGS. 4 and 5, first output ports A and second output ports B that communicate individually with the four valve holes 11 as can be seen from FIGS. 4 and 6, and a first discharge port EA and a second discharge port EB that communicate commonly with the four valve holes 11 as can be seen from FIGS. 4 and 7, are arranged such that along the axes of the valve holes 11, the supply port P is located in the middle, the first output ports A and second output ports B are located on both sides of the supply ports P, and the first discharge port EA and second discharge port EB are located on both outer sides of the first output ports A and second output ports B.

As shown in FIG. 5, the supply port P is divided into two left and right supply ports P. The right supply port P communicates with the two valve holes 11a and 11b located in the right half of the valve body 10. The left supply port P communicates with the two valve holes 11a and 11b located in the left half of the valve body 10. However, the two supply ports P may be integrated.

The first output port A and second output port B are provided not only in the attaching surface 10c of the lower surface of the valve body 10 but also in a port forming surface 15a of the upper surface of the valve body 10. That is to say, from each valve hole 11, the output communication holes 14a extend nearly straight downward and communicate with the first output ports A and second output ports B in the attaching surface 10c, and the output communication holes 14b extend nearly straight upward, toward the upper surface of the valve body 10, and communicate with the first output ports A and second output ports B in the port forming surface 15a. Thus, the output ports A and B in the upper surface and lower surface of the valve body 10 can be used selectively. In the illustrated example, the output ports A and B in the lower surface are closed by the manifold base 2, and the output ports A and B in the upper surface are used.

In the case where the output ports A and B in the lower surface of the valve body 10 are used, although not specifically illustrated, output ports that communicate with the output ports A and B in the lower surface of the valve body 10 through communication hole inside the manifold base 2 are formed in the side surface or lower surface of the manifold base 2, and pipe joints are attached to these. On the other hand, on the upper surface of the valve body 10, a sealing plate is attached in place of a port block 15 to be described later. By the sealing plate, the output communication holes 14b are closed.

As described above, in order to form the output ports A and B in the upper surface of the valve body 10, the port block 15 is attached to the upper surface of the valve body 10, the port forming surface 15a parallel to the axes of the valve holes 11 is formed on the upper surface of the port block 15, and the first output ports A and second output ports B are provided in the port forming surface 15a. The output ports A and B are connected to the upper ends of the output communication holes 14b of the valve body 10. To each of the output ports A and B, a hollow cylindrical pipe joint 16 is attached.

In the figures, the reference numeral 17 denotes left and right retaining plates for retaining the pipe joints 16. The retaining plates 17 are placed on the port block 15, with the pipe joints 16 fitted in cuts 17a formed in a staggered manner in the left and right side edges of each retaining plate 17, and with the edges of the cuts 17a fitted and retained in retaining grooves 16a of the pipe joints 16, and are fixed to the port block 15 with two plate fixing screws 18a and 18b.

Of the two plate fixing screws 18a and 18b, one plate fixing screw 18a is longer than the other plate fixing screw 18b and can be screwed through the port block 15 into a screw hole 18c in the upper surface of the valve body 10. By the plate fixing screws 18a, the retaining plates 17 and the port block 15 are fixed to the valve body 10.

Although in FIGS. 5 to 7, because of the cutting position, the sectional shape of the pipe joints 16 is not hollow cylindrical, each pipe joint 16 is a hollow cylinder as shown in FIG. 4. Although the pipe joints 16 are depicted in a simplified form, the pipe joints 16 are preferably known quick-connect pipe joints configured such that just by inserting a piping tube into a connecting port 16b, the piping tube is connected and locked.

As can be seen from each figure, the port block 15 is substantially the same shape and size in the plan view as the valve body 10. The port block 15 is placed on the upper surface of the valve body 10. By screwing two fixing screws 19 passed through screw passing holes 19a into screw holes of the manifold base 2, the port block 15 and the valve body 10 are fixed to the manifold base 2 by tightening together. Therefore, the port block 15 substantially forms part of the valve body 10, and the port forming surface 15a is formed on the upper surface of the valve body 10.

The screw passing holes 19a are formed in the middle in the width direction of the valve body 10 at positions close to the first end face 10a and the second end face 10b of the valve body 10.

Two output ports (a first output port A and a second output port B) are formed for each valve hole 11 along its axis. Therefore, a total of eight output ports A and B are formed in the port forming surface 15a. The first output ports A and second output ports B are formed above the valve holes 11 with which they communicate, so as to overlap the valve holes 11.

Figure 3:
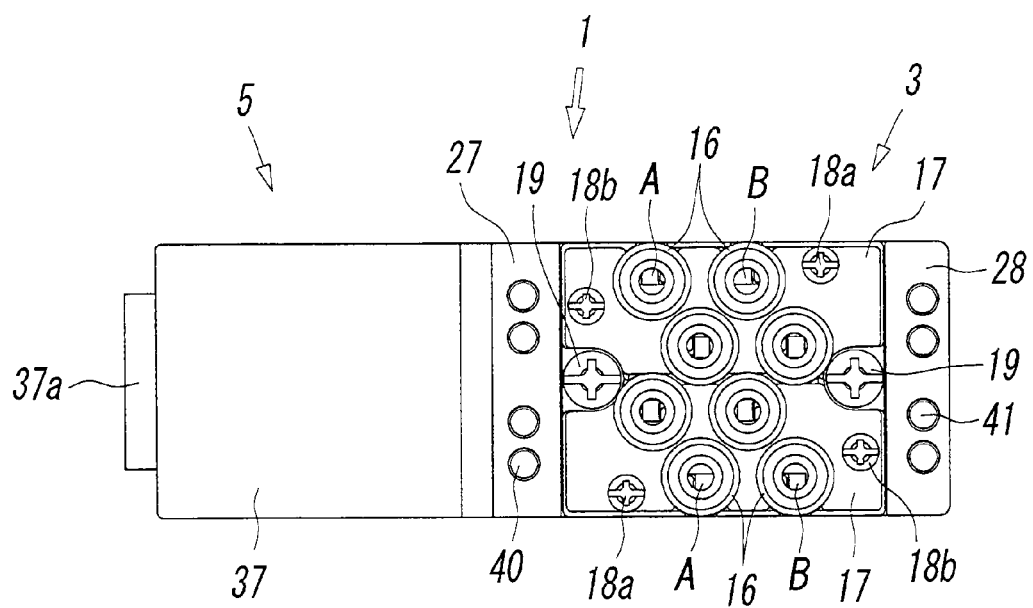
FIG. 3 is a plan view of FIG. 1.

As is clear from FIGS. 2 and 3, the output ports A and B are circular holes, and are disposed such that the output ports, that is to say, the first output ports A and second output ports B of adjacent valve holes 11 are not disposed exactly in a straight line in the width direction of the port block 15, and that adjacent output ports occupy different positions in the direction of axes of the valve holes 11 and partially overlap each other when the valve body 10 is viewed from the width direction (from the side). The output ports A and B are disposed such that adjacent first output ports A partially overlap each other and adjacent second output ports B partially overlap each other also when the valve body 10 is viewed from the first end face 10a, that is to say, from the direction of axes of the valve holes 11.

In the illustrated example, each output port is disposed such that at a position midway between the first output port A and second output port B of a valve hole 11, the first output port A or second output port B of another valve hole 11 adjacent thereto is located. Therefore, the arrangement of the pipe joints 16 is the same as that of the output ports A and B.

The manifold base 2 has a common supply flow path 21 and a common discharge flow path 22 as shown in FIG. 1, supplies main fluid from the common supply flow path 21 to the supply port P of the valve body 10, and discharges discharged fluid from the first discharge port EA and second discharge port EB of the valve body 10 through the common discharge flow path 22.

Each spool 4 has a plurality of seal members 23 on its outer periphery. By bringing the seal members 23 into and out of contact with the inner periphery of the valve hole 11, flow paths between the ports are opened and closed.

To the first end face 10a and second end face 10b of the valve body 10, a first end block 27 and second end block 28 that are rectangular are attached. In the inner end face, that is to say, the surface facing the first end face 10a of the first end block 27, first pilot pressure chambers 29 that first pressure receiving surfaces 4a at one ends of the spools 4 face are formed. In the inner end face, that is to say, the surface facing the second end face 10b of the second end block 28, second pilot pressure chambers 30 and piston chambers 31 that second pressure receiving surfaces 4b of the spools 4 face are formed. In the piston chambers 31, pistons 32 that are smaller than the second pressure receiving surfaces 4b in pressure receiving area are placed so as to be able to be brought into and out of contact with the spools 4. On the pressure receiving surface 32a side of the pistons 32, third pilot pressure chambers 33 are formed. The first pressure receiving surfaces 4a and the second pressure receiving surfaces 4b are equal in pressure receiving area.

To the outer end face of the first end block 27, the pilot operating portion 5 is attached. As shown in FIG. 2, the pilot operating portion 5 has a pilot valve body 36 that includes a base portion 36a and a middle portion 36b and that has a substantially T-shaped cross-section. The base portion 36a is fixed to the outer end face of the first end block 27 with screws 38. To each of the upper and lower surfaces of the middle portion 36b, four pilot valves 6 are attached. Therefore, a total of four sets of (eight) pilot valves 6 are provided in the pilot operating portion 5.

To the base portion 36a, a box-shaped cover 37 is attached. By this cover 37, the whole pilot valve 6 is covered. In the figures, the reference numeral 37a denotes a connecting port for connecting an electrical supply connector from a control unit.

A pilot valve 6 in the upper tier, that is to say, a first pilot valve 6a and a pilot valve 6 in the lower tier, that is to say, a second pilot valve 6b are paired, and a pair of pilot valves 6a and 6b drives a spool 4. The use as a double solenoid electromagnetic valve in which the first pilot valve 6a and the second pilot valve 6b are alternately turned on and off and the spool 4 is thereby reciprocated, and the use as a single solenoid electromagnetic valve in which the second pilot valve 6b is stopped, only the first pilot valve 6a is turned on and off, and the spool 4 is thereby reciprocated, can be selectively performed by switching first switching units 40 provided in the first end block 27 and second switching units 41 provided in the second end block 28.

The pilot valves 6 are arranged such that the pilot valves 6a in the upper tier occupy the same position in the height direction (the top-bottom direction) and the pilot valves 6b in the lower tier occupy the same position in the height direction, and that the pilot valves 6a in the upper tier and the pilot valves 6b in the lower tier fully overlap each other in the plan view.

The switching units 40 and 41 are configured such that a shaft-like valve member is manually pressed down and is returned by a return spring. Of these, at least the second switching units 41 can be locked in an operative position that is a depressed state.

Figure 8:
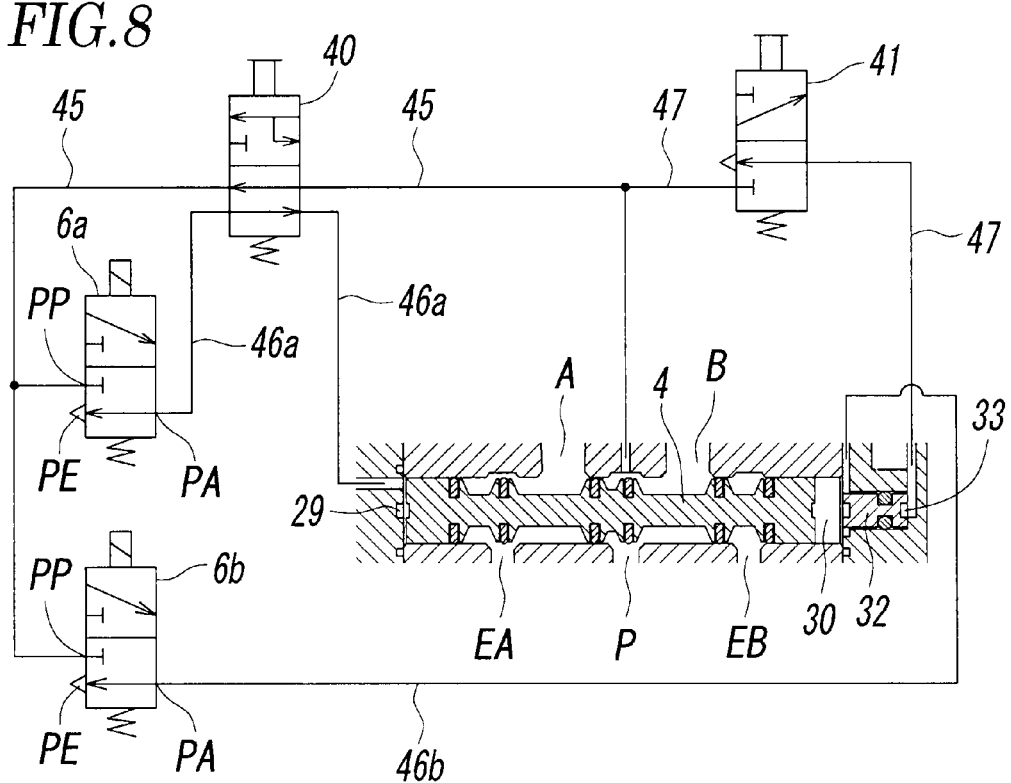
FIG. 8 is a flow path connection diagram, using symbols, of a driving system that drives a spool with pilot fluid in the case where the multiple electromagnetic valve is used as a double-solenoid electromagnetic valve.
Figure 9:
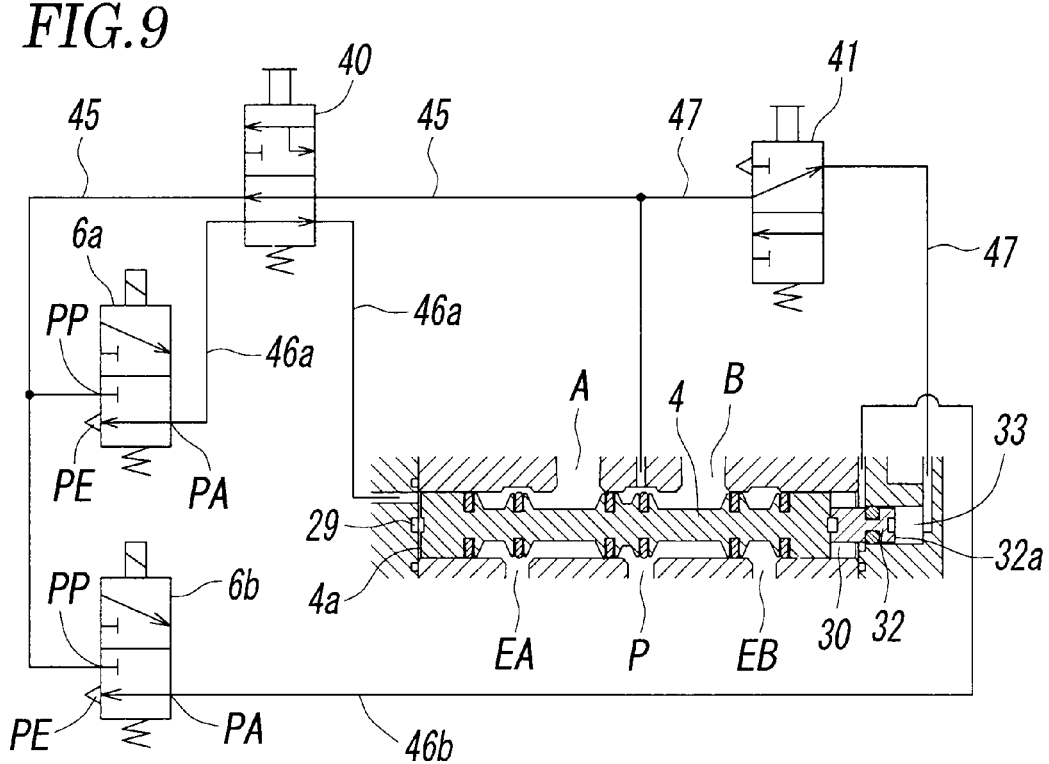
FIG. 9 is a flow path connection diagram, using symbols, of a driving system that drives a spool with pilot fluid in the case where the multiple electromagnetic valve is used as a single-solenoid electromagnetic valve.

The first pilot valves 6a and the second pilot valves 6b have a structure substantially as a three port electromagnetic valve, and have the same structure. In FIGS. 8 and 9, connection diagrams of pilot flow paths for driving the spool 4 using the pilot valves 6a and 6b are shown in which the pilot valves 6a and 6b and the switching units 40 and 41 are represented by symbols.

In FIGS. 4, 8, and 9, the pilot supply ports PP of the first pilot valve 6a and second pilot valve 6b communicate commonly with the supply port P of the main valve portion 3, with the first switching unit 40 therebetween, through a first pilot supply flow path 45 extending inside the valve body 10, the first end block 27, and the pilot valve body 36.

The pilot output port PA of the first pilot valve 6a is connected to the first pilot pressure chamber 29 with the first switching unit 40 therebetween by a first pilot output flow path 46a. The pilot output port PA of the second pilot valve 6b is connected to the second pilot pressure chamber 30 by a second pilot output flow path 46b.

The supply port P of the main valve portion 3 communicates with the third pilot pressure chamber 33, with the second switching unit 41 therebetween, through a second pilot supply flow path 47 extending inside the valve body 10 and the second end block 28.

When the multiple electromagnetic valve is used as a double solenoid electromagnetic valve, as shown in FIG. 8, both the first switching unit 40 and second switching unit 41 are held in the inoperative position. Thus, the third pilot pressure chamber 33 becomes open to the atmosphere through the second switching unit 41.

In this state, by alternately turning on and off the first pilot valve 6a and second pilot valve 6b, pilot fluid is alternately supplied to and discharged from the first pilot pressure chamber 29 and second pilot pressure chamber 30, and the spool 4 is thereby reciprocated.

When the multiple electromagnetic valve is used as a single solenoid electromagnetic valve, as shown in FIG. 9, the second switching unit 41 is pressed down to the illustrated operative position and locked at the position with the first switching unit 40 held at the inoperative position. Thus, the third pilot pressure chamber 33 always communicates with the supply port P through the second pilot supply flow path 47 and is thereby always supplied with pilot fluid, and the pilot fluid pressure always acts on the pressure receiving surface 32a of the piston 32.

By turning on and off only the first pilot valve 6a and thereby supplying and discharging pilot fluid to and from the first pilot pressure chamber 29 with the second pilot valve 6b stopped and the second pilot pressure chamber 30 open to the atmosphere, the spool 4 is reciprocated due to the difference in pressure receiving area between the first pressure receiving surface 4a of the spool 4 and the pressure receiving surface 32a of the piston 32.

By pressing down the first switching unit 40 to the operative position and returning it without operating the first pilot valve 6a, the spool 4 can also be reciprocated. That is to say, when the first switching unit 40 is pressed down from the inoperative position of FIG. 9 to the operative position, the first pilot pressure chamber 29 communicates with the supply port P through the first pilot output flow path 46a, the first switching unit 40, and the first pilot supply flow path 45, and therefore the spool 4 moves rightward in the figure. When the first switching unit 40 is returned to the inoperative position of FIG. 9, the first pilot pressure chamber 29 becomes open to the atmosphere through the first pilot output flow path 46a, the first switching unit 40, and the first pilot valve 6a, and therefore the spool 4 moves leftward in the figure.

Figure 10:
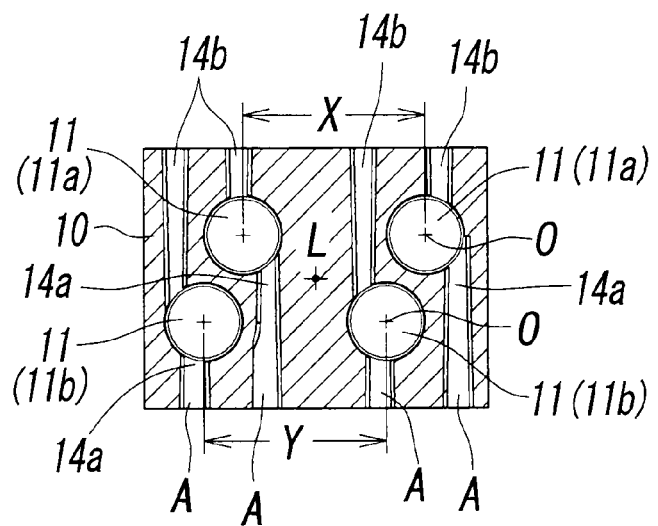
FIG. 10 is a sectional view of the valve body in a second embodiment of a multiple electromagnetic valve according to the present invention cut at the position of the first output ports.

FIG. 10 shows the section of the main part of the valve body 10 in a second embodiment of the present invention. The second embodiment differs in the arrangement of the valve holes 11 from the first embodiment.

Inside the valve body 10, four valve holes 11 are arranged such that two valve holes are located in each of the upper tier and lower tier. The distance X between the centers of the two valve holes 11a in the upper tier and the distance Y between the centers of the two valve holes 11b in the lower tier are equal to each other, and the valve holes 11a in the upper tier are closer to one end in the width direction of the valve body 10 than the valve holes 11b in the lower tier are. Therefore, in this embodiment, the four valve holes 11 are arranged line-symmetrically with respect to an imaginary straight line L extending inside the valve body 10 parallel to the axes of the valve holes 11.

In the illustrated example, the two upper and lower valve holes 11a and 11b in the left half of the valve body 10 overlap each other, the two upper and lower valve holes 11a and 11b in the right half of the valve body 10 overlap each other, and the valve hole 11a located in the upper tier of the left half and the valve hole 11b located in the lower tier of the right half do not overlap each other, but they may overlap each other.

The distance X between the centers of the two valve hole 11a in the upper tier and the distance Y between the centers of the two valve hole 11b in the lower tier may be different from each other. In this case, the arrangement of the four valve holes 11 is not line-symmetrical with respect to the imaginary straight line L.

Except for the above-described respect, the second embodiment is substantially the same as the first embodiment.

Figure 11:
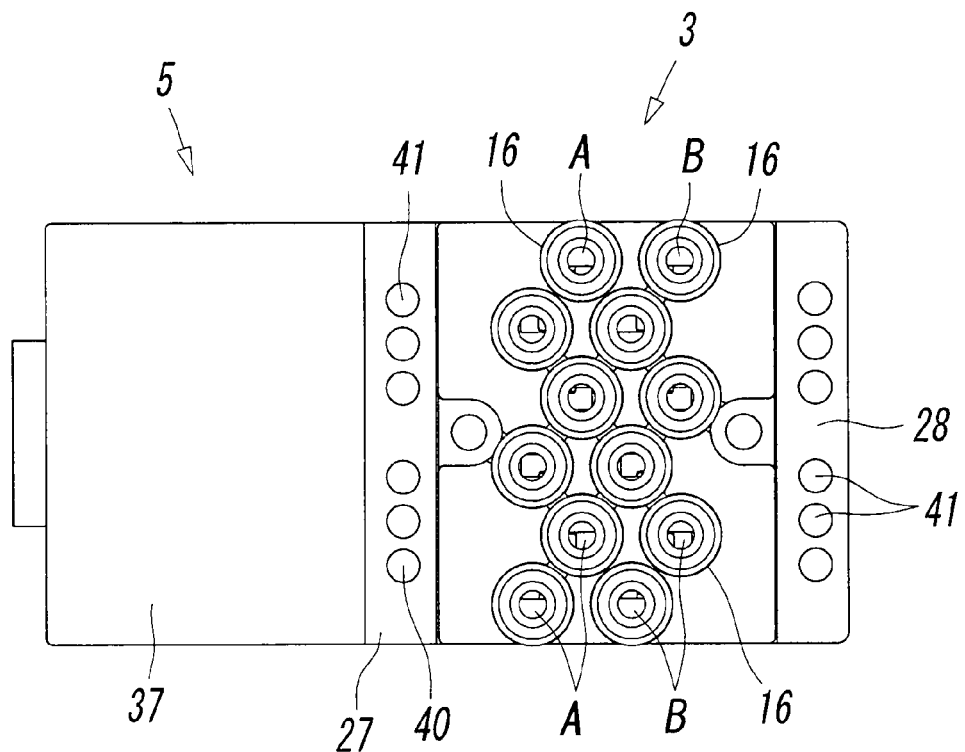
FIG. 11 is a plan view of a third embodiment of a multiple electromagnetic valve according to the present invention.
Figure 12:
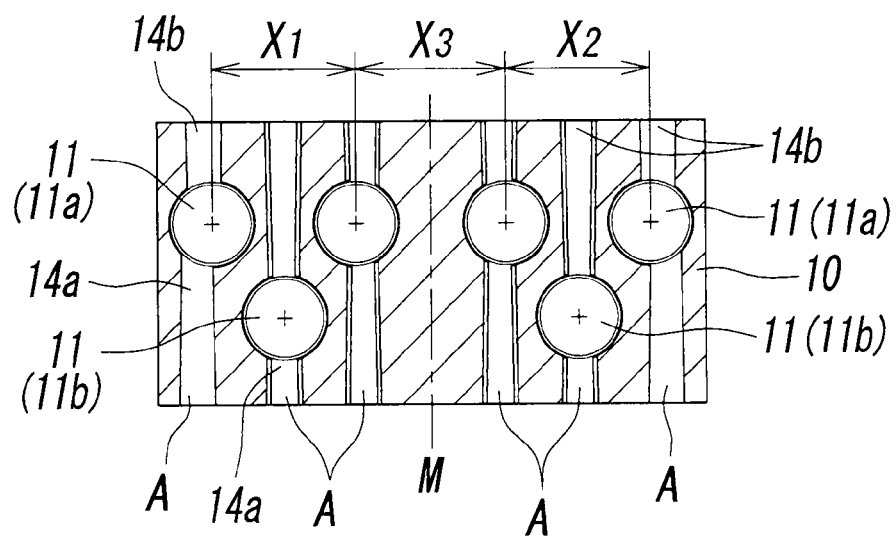
FIG. 12 is a sectional view of the valve body in the third embodiment cut at the position of the first output ports.

FIGS. 11 and 12 show a third embodiment of the present invention. The third embodiment differs in the number and arrangement of the valve holes 11 and the output ports A and B from both the first embodiment and second embodiment.

That is to say, as shown in FIG. 12, six valve holes 11 are formed inside the valve body 10, and these valve holes 11 are arranged such that four valve holes 11a are located in the upper tier and two valve holes 11b are located in the lower tier. Of the four valve holes 11a in the upper tier, the distance X1 between the centers of the two valve holes 11a in the left half and the distance X2 between the centers of the two valve holes 11a in the right half are equal to each other, and the two valve holes 11b in the lower tier occupy a position midway between the two valve holes 11a in the left half of the upper tier and a position midway between the two valve holes 11a in the right half. Of the four valve holes in the upper tier, the distance X3 between the centers of the two valve holes 11a located in the middle may be equal to or different from the distance X1, X2.

Therefore, in the third embodiment, the six valve holes 11 are arranged symmetrically with respect to an imaginary plane M that divides the valve body 10 into two (left and right) halves.

As shown in FIG. 11, a total of 12 output ports A and B are formed in the upper surface of the valve body 10. The arrangement of them is substantially the same as the arrangement of the first embodiment to which two output ports A and B are newly added according to the same regularity.

Except for the above-described respects, the third embodiment is substantially the same as the first embodiment. So, the same reference numerals will be used to designate the same main components as those in the first embodiment, and the description thereof will be omitted.

In the case where six valve holes 11 are provided in the valve body 10, instead of arranging six valve holes 11 as in the third embodiment, two upper and lower valve holes may be newly added to the right or left of the four valve holes 11 of the first embodiment shown in FIG. 6 such that they are in a left-right symmetrical positional relationship with two upper and lower valve holes 11a and 11b adjacent thereto, or two upper and lower valve holes may be newly added to the right or left of the four valve holes 11 of the second embodiment shown in FIG. 10 such that they are in the same positional relationship with each other as the positional relationship between two upper and lower valve holes 11a and 11b adjacent thereto. In these cases, three valve holes 11a and 11b belong in each of the upper tier and lower tier.

The number of the valve holes 11 does not necessarily have to be an even number and may be an odd number greater than or equal to five as long as these valve holes are disposed inside the valve body in two (upper and lower) tiers such that the valve holes in the upper tier and the valve holes in the lower tier occupy different positions in the width direction of the valve body, and that in the plan view of the valve body, the valve holes in the upper tier and the valve holes in the lower tier partially overlap each other.

Although the above embodiments are five-port valves, the present invention can also be applied to a three-port valve or a four-port valve.

The invention claimed is:

1. A multiple electromagnetic valve comprising: a main valve portion in which four or more valve holes are formed parallel to each other inside a valve body, and a spool for switching flow paths is placed in each valve hole, and in which a plurality of output ports communicating individually with each valve hole is provided; and a pilot operating portion having solenoid-operated pilot valves that drive the spools with pilot fluid, wherein the valve holes are divided into one upper tier and one lower tier and disposed inside the valve body, a plurality of valve holes belongs in each of the upper tier and lower tier, the valve holes in the upper tier and the valve holes in the lower tier occupy different positions in the width direction of the valve body, and the valve holes in the upper tier and the valve holes in the lower tier partially overlap each other in the plan view of the valve body, and
wherein the plurality of output ports are formed in a port forming surface of the upper surface of the valve body parallel to an axis of the valve holes, the output ports of any two adjacent valve holes occupy different positions in the direction of the axes of the valve holes, and both when the output ports are viewed from the direction of the side of the valve body and when the output ports are viewed from the direction of the axes of the valve holes, any two adjacent output ports partly overlap each other.

2. The multiple electromagnetic valve according to claim 1, wherein one of the valve holes in the upper tier and one of the valve holes in the lower tier overlap each other.

3. The multiple electromagnetic valve according to claim 2, wherein four valve holes are arranged such that two valve holes are located in each of the upper tier and lower tier, the distance between the centers of the two valve holes in the upper tier and the distance between the centers of the two valve holes in the lower tier differ from each other, and the valve holes in the upper tier or lower tier are closer to the middle in the width direction of the valve body than the valve holes in the lower tier or upper tier are.

4. The multiple electromagnetic valve according to claim 2, wherein four valve holes are arranged such that two valve holes are located in each of the upper tier and lower tier, and the valve holes in the upper tier are closer to one end in the width direction of the valve body than the valve holes in the lower tier are.

5. The multiple electromagnetic valve according to claim 1, wherein at least one of the valve holes in the upper tier or lower tier and two of the valve holes in the lower tier or upper tier overlap each other.

6. The multiple electromagnetic valve according to claim 5, wherein four valve holes are arranged such that two valve holes are located in each of the upper tier and lower tier, and the valve holes in the upper tier are closer to one end in the width direction of the valve body than the valve holes in the lower tier are.

7. The multiple electromagnetic valve according to claim 1, wherein four valve holes are arranged such that two valve holes are located in each of the upper tier and lower tier, the distance between the centers of the two valve holes in the upper tier and the distance between the centers of the two valve holes in the lower tier differ from each other, and the valve holes in the upper tier or lower tier are closer to the middle in the width direction of the valve body than the valve holes in the lower tier or upper tier are.

8. The multiple electromagnetic valve according to claim 1, wherein four valve holes are arranged such that two valve holes are located in each of the upper tier and lower tier, and the valve holes in the upper tier are closer to one end in the width direction of the valve body than the valve holes in the lower tier are.

9. The multiple electromagnetic valve according to claim 1, wherein the valve holes are arranged symmetrically with respect to an imaginary plane that divides the valve body into two halves in the width direction.

10. The multiple electromagnetic valve according to claim 1, wherein the valve holes are arranged line-symmetrically with respect to an imaginary straight line extending inside the valve body parallel to the axes of the valve holes.

11. The multiple electromagnetic valve according to claim 1, wherein the pilot valves are arranged in the pilot operating portion in two upper and lower tiers, a plurality of pilot valves belongs in each of the upper tier and lower tier, the pilot valves in the upper tier occupy the same level, the pilot valves in the lower tier occupy the same level, and the pilot valves in the upper tier and the pilot valves in the lower tier fully overlap each other in the top-bottom direction in the plan view.

* * * * *